(12) United States Patent
Raether et al.

(10) Patent No.: US 10,440,990 B2
(45) Date of Patent: Oct. 15, 2019

(54) COMPOSITE HEAT SOURCE FOR A SMOKING ARTICLE

(71) Applicant: Philip Morris Products S.A., Neuchatel (CH)

(72) Inventors: Friedrich Raether, Bayreuth (DE); Holger Friedrich, Arnsdorf (DE); Jens Baber, Wurzbuerg (DE)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/661,884

(22) Filed: Jul. 27, 2017

(65) Prior Publication Data

US 2018/0000155 A1    Jan. 4, 2018

Related U.S. Application Data

(63) Continuation of application No. 14/368,693, filed as application No. PCT/EP2012/077033 on Dec. 28, 2012, now abandoned.

(30) Foreign Application Priority Data

Dec. 29, 2011    (EP) .................................. 11196058

(51) Int. Cl.
*A24F 47/00* (2006.01)
*A24B 15/16* (2006.01)
*C10L 5/00* (2006.01)

(52) U.S. Cl.
CPC .......... *A24F 47/004* (2013.01); *A24B 15/165* (2013.01); *C10L 5/00* (2013.01)

(58) Field of Classification Search
CPC .... A24F 47/004; A24F 47/006; A24B 15/165; C10L 5/00
See application file for complete search history.

(56) References Cited

U.S. PATENT DOCUMENTS

| 4,991,606 A | 2/1991 | Serrano et al. |
| 5,146,934 A | 9/1992 | Deevi et al. |
| (Continued) | | |

FOREIGN PATENT DOCUMENTS

| CN | 1040134 A | 3/1990 |
| CN | 1040496 A | 3/1990 |
| (Continued) | | |

OTHER PUBLICATIONS inchem.org, Ferric oxide, downloaded online Jul. 5, 2018.*

(Continued)

*Primary Examiner* — Anthony Calandra
(74) *Attorney, Agent, or Firm* — Oblon, McClelland, Maier & Neustadt, L.L.P.

(57) ABSTRACT

A composite heat source for use in a smoking article is provided, including a non-combustible porous ceramic matrix; and a particulate combustible fuel embedded within the non-combustible porous ceramic matrix. The non-combustible porous ceramic matrix is formed from one or more particulate materials having a median D50 particle size at least five times less than the median D50 particle size of the particulate combustible fuel. Preferably, the non-combustible porous ceramic matrix includes one or more transition metal oxides.

14 Claims, 2 Drawing Sheets

(56) References Cited

U.S. PATENT DOCUMENTS

| | | |
|---|---|---|
| 5,159,940 A | 11/1992 | Hayward et al. |
| 5,246,018 A | 9/1993 | Deevi et al. |
| 5,443,560 A | 8/1995 | Deevi et al. |
| 5,468,266 A | 11/1995 | Bensalem et al. |
| 2005/0274390 A1 | 12/2005 | Banerjee et al. |

FOREIGN PATENT DOCUMENTS

| | | |
|---|---|---|
| CN | 1087497 A | 6/1994 |
| CN | 1100453 A | 3/1995 |
| CN | 1547438 A | 11/2004 |
| CN | 101076263 A | 11/2004 |
| DE | 10 2004 055 900 A1 | 5/2006 |
| EP | 0 372 985 A2 | 6/1990 |
| EP | 0 467 658 A2 | 1/1992 |
| EP | 0 494 784 A2 | 7/1992 |
| EP | 0 352 108 B1 | 3/1995 |
| EP | 0 337 508 B1 | 8/1995 |
| EP | 0 525 347 B1 | 5/1997 |
| EP | 0 623 289 B1 | 10/1997 |
| JP | 6-183871 A | 7/1994 |
| JP | 2008-505990 A | 2/2008 |
| WO | WO 03/082031 A1 | 10/2003 |
| WO | WO 2004/110184 A2 | 12/2004 |
| WO | WO 2005/039327 A2 | 5/2005 |
| WO | WO 2006/053521 A1 | 5/2006 |
| WO | WO 2009/022232 A2 | 2/2009 |

OTHER PUBLICATIONS

Oxoiron, Ferrous oxide, downloaded online Jul. 6, 2018.*
Extended European Search Report dated Jun. 20, 2012 in Patent Application No. 11196058.9.
International Search Report dated Jun. 4, 2013 in PCT/EP12/077033 Filed Dec. 28, 2012.
Combined Chinese Office Action and Search Report dated Dec. 24, 2015 in Patent Application No. 201280056053.4 (with English language translation).
Combined Taiwanese Office Action and Search Report dated Aug. 5, 2016 in Patent Application No. 101150954 (with English language translation).
Japanese Office Action dated Nov. 2, 2016 in Patent Application No. 2014-549481 (with English Translation).
Iron Oxide Density, downloaded online Jan. 23, 2017.
Tigg, Granulated Activated Carbon [downloaded online Apr. 4, 2016], downloaded from www.tigg.com.

\* cited by examiner

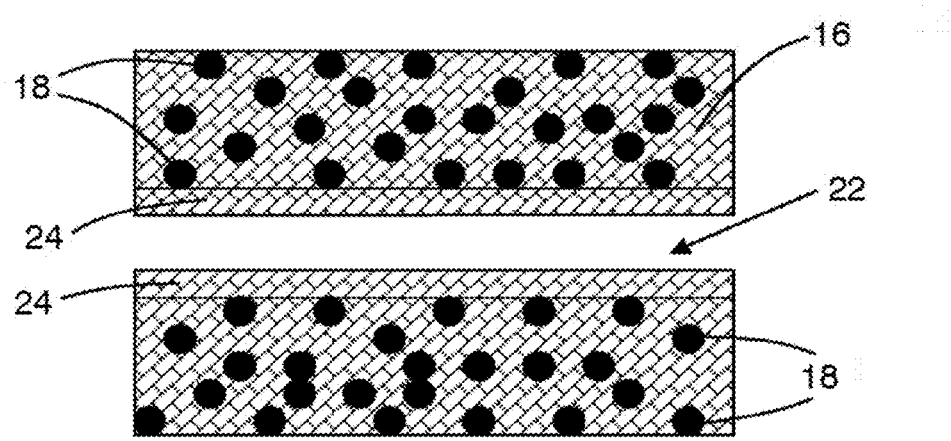
FIG. 4
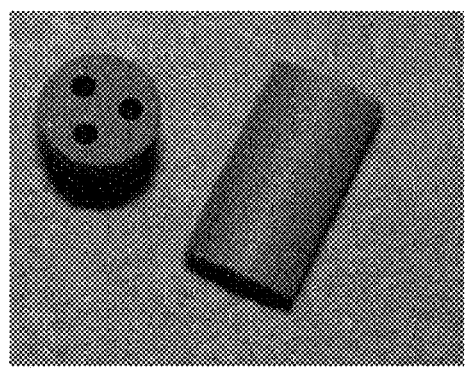 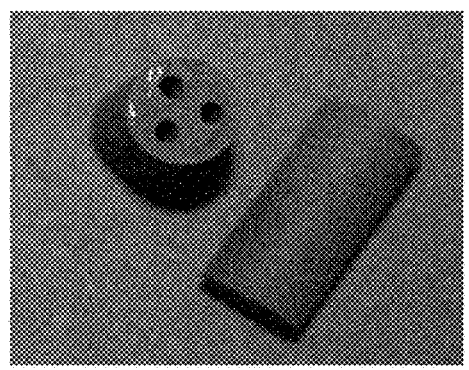
FIG. 5A  FIG. 5B

COMPOSITE HEAT SOURCE FOR A SMOKING ARTICLE

CROSS-REFERENCE TO RELATED APPLICATIONS

This application is a continuation application of and claims the benefit of priority under 35 U.S.C. § 120 to pending U.S. application Ser. No. 14/368,693, filed Jun. 25, 2014, which is a U.S. National Stage application of PCT/EP2012/077033, filed Dec. 28, 2012, and claims benefit of priority under 35 U.S.C. § 119 to EP 11196058.9, filed Dec. 29, 2011, the entire contents of each of which are incorporated herein by reference.

TECHNICAL FIELD

The present invention relates to a heat source, for example a heat source suitable for use in a smoking article. The present invention further relates to a smoking article comprising a heat source according to the invention.

BACKGROUND

Smoking articles in which an aerosol is generated by the transfer of heat from a combustible heat source to a physically separate aerosol-generating material are known in the art. The aerosol-generating material may be located within, around or downstream of the heat source. In use, the combustible heat source of the smoking article is lit and volatile compounds are released from the aerosol-generating material by heat transfer from the combustible heat source. The released volatile compounds are entrained in air and drawn through the smoking article upon puffing. The formed aerosol is inhaled by the consumer.

It is desirable for a combustible heat source suitable for use in a smoking article to have certain attributes to enable or enhance the smoking experience.

For example, the heat source should produce enough heat during combustion to allow release of a flavoured aerosol from an aerosol-generating material, but still be sufficiently small to fit within a smoking article that may be of a similar size as a conventional lit-end cigarette.

Furthermore, the heat source should be capable of burning with a limited amount of air until the fuel in the heat source is expended and should also produce as little as possible or substantially no carbon monoxide, nitrogen oxides or other potentially undesirable gases upon combustion.

In addition, the ignition temperature of the heat source should be sufficiently low that the heat source is readily ignitable under normal lighting conditions for a conventional lit-end cigarette using, for example, a match or conventional cigarette lighter.

The heat source should also have an appropriate thermal conductivity. If too much heat is conducted away from the burning zone of the heat source to other parts of the heat source during combustion, combustion at the burning zone of the heat source will cease when the temperature drops below the extinguishment temperature of the heat source. Therefore, a heat source with too high a thermal conductivity may undesirably be difficult to ignite and, after ignition, subject to premature self-extinguishment. The thermal conductivity of the heat source should be at a level that, in use, allows effective heat transfer to the aerosol-generating material without conducting too much heat to any means or structure by which it is fixed, mounted or otherwise incorporated in the smoking article.

The heat source should also not disintegrate before or during use and should be able to withstand small mechanical stresses that may occur as a result, for example, of a consumer dropping the smoking article.

It would be desirable to provide a composite heat source suitable for use in smoking articles that meets some or all of the above requirements.

It would further be desirable to provide a composite heat source capable of catalysing the decomposition of one or more potentially undesirable gases produced during combustion thereof.

It would also be desirable to provide a composite heat source capable of retaining particulate matter produced during combustion thereof.

SUMMARY

According to the present invention there is provided a composite heat source, for example a composite heat source suitable for use in a smoking article, the composite heat source comprising: a porous non-combustible ceramic matrix; and a particulate, combustible fuel completely embedded within the non-combustible porous ceramic matrix, wherein the non-combustible porous ceramic matrix is formed from one or more particulate materials having a median D50 particle size at least five times less than the median D50 particle size of the particulate combustible fuel.

BRIEF DESCRIPTION OF THE DRAWINGS

Embodiments will be further described, by way of example only, with reference to the accompanying drawings in which:

FIG. 4 shows a schematic longitudinal cross-sectional view of a composite heat source according to a second embodiment of the present invention;

FIG. 5a shows a composite heat source according to the present invention prepared in accordance with Example 1; and FIG. 5b shows a composite heat source according to the present invention prepared in accordance with Example 2.

DETAILED DESCRIPTION

Figure 1:
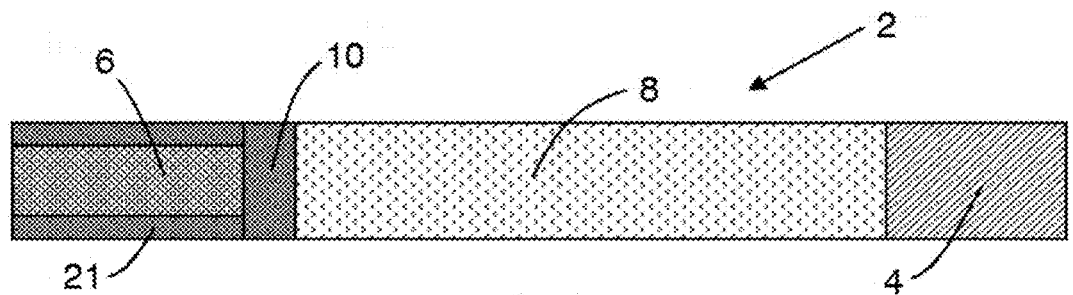
FIG. 1 shows a schematic longitudinal cross-sectional view of a smoking article according to a first embodiment of the present invention.

As used herein, the term 'composite heat source' (singular or plural) is used to denote a heat source comprising at least two distinct components that in combination produce properties not present in the at least two components individually. As described further below, the functions of composite heat sources according to the present invention are advantageously divided between the non-combustible porous ceramic matrix and the combustible fuel embedded within the non-combustible porous ceramic matrix.

As used herein, the term 'ceramic' is used to denote any non-metallic solid which remains solid when heated.

As used herein, the term 'completely embedded' is used to denote that the particles of combustible fuel are completely surrounded by the non-combustible porous ceramic matrix. That is, there is substantially no contact between particles of combustible fuel embedded within the non-combustible porous ceramic matrix.

As used herein, the term 'median D50 particle size" is used to denote the volume-basis median value of the particle size distribution and is the value of the particle diameter at 50% in the cumulative distribution.

Preferably, the non-combustible porous ceramic matrix is formed from one or more particulate materials having a median D50 particle size at least ten times less than the median D50 particle size of the particulate combustible fuel.

The strength of composite heat sources according to the invention is predominantly controlled by the non-combustible porous ceramic matrix. Decoupling of the strength of composite heat sources according to the present invention from the combustible fuel embedded within the non-combustible porous ceramic matrix is advantageous, as the combustible fuel undergoes large changes during combustion making it difficult to control its mechanical behaviour.

The particles of combustible fuel in composite heat sources according to the present invention have substantially no contact with each other and are embedded within individual cavities within the non-combustible porous ceramic matrix. During combustion, the particles of combustible fuel undergo changes within these individual cavities, but the structure of the non-combustible porous ceramic matrix advantageously remains substantially unchanged.

Completely embedding the particulate fuel within the non-combustible porous ceramic matrix in accordance with the present invention advantageously avoids a number of significant drawbacks in combustion properties associated with prior art heat sources comprising a non-combustible porous ceramic matrix and a particulate combustible fuel in which the particles of combustible fuel are in contact with each other.

During combustion, new pore channels with large diameters may be formed in such prior art heat sources as a result of the combustion of the connected particles of combustible fuel. As a result, hot particles of combustible fuel may disadvantageously escape from such prior art heat sources through the newly formed channels.

Furthermore, the mechanical integrity of such prior art heat sources may disadvantageously decrease to a critical level during combustion due to the formation of weak zones as a result of the combustion of the connected particles of combustible fuel.

Preferably, the non-combustible porous ceramic matrix has a compressive strength of greater than or equal to about 10 megapascals (MPa) as measured in a standard mechanical testing device by pushing the front and rear face of the sample with constant strain rate and measuring the force, when the sample is destroyed. This enables composite heat sources according to the present invention to withstand small mechanical stresses and preventing disintegration of the composite heat sources before and during use.

The pores within the non-combustible porous ceramic matrix of composite heat sources according to the present invention control the combustion kinetics of the composite heat sources.

Preferably, the non-combustible porous ceramic matrix has substantially continuous pore channels. Use of a non-combustible porous ceramic matrix having substantially continuous pore channels in composite heat sources according to the present invention advantageously enables oxygen to flow through the substantially continuous pore channels to the combustible fuel embedded within the non-combustible porous ceramic matrix. In addition, it advantageously allows carbon monoxide or carbon dioxide produced during combustion of the combustible fuel to flow out of composite heat sources according to the present invention through the substantially continuous pore channels.

In preferred embodiments of the present invention, the non-combustible porous ceramic matrix has pores that are sufficiently small to retain any particulate material produced during combustion of the fuel embedded within the non-combustible porous ceramic matrix.

Preferably, the non-combustible porous ceramic matrix has pores with diameters of between about 0.01 microns ($\mu$m) and about 10 microns ($\mu$m) as measured by mercury porosimetry.

The conductivity of composite heat sources according to the invention is predominantly controlled by the non-combustible porous ceramic matrix. The use of a ceramic material with low thermal conductivity advantageously enables composite heat sources according to the present invention having moderate thermal conductivity to be produced, even when the thermal conductivity of the combustible fuel embedded within the non-combustible porous ceramic matrix is much higher.

Preferably, the non-combustible porous ceramic matrix has a thermal diffusivity of less than or equal to about $1 \times 10^{-6}$ square meters per second ($m^2/s$) as measured using the laser flash method. More preferably, the non-combustible porous ceramic matrix has a thermal diffusivity of between about $0.4 \cdot 10^{-6}$ $m^2/s$ and about $1 \cdot 10^{-6}$ $m^2/s$ as measured using the laser flash method. Use of a non-combustible porous ceramic matrix having a thermal diffusivity of less than or equal to about $1 \times 10^{-6}$ $m^2/s$ in composite heat sources according to the present invention advantageously enables the combustible fuel embedded within the non-combustible porous ceramic matrix to be ignited using a match, lighter or other suitable ignition means within about 10 seconds.

In preferred embodiments of the present invention, the non-combustible porous ceramic matrix does not undergo significant volumetric changes during combustion of the combustible fuel embedded within the non-combustible porous ceramic matrix.

Preferably, the coefficient of thermal expansion of the non-combustible porous ceramic matrix is greater than the coefficient of thermal expansion of the combustible fuel embedded within the non-combustible porous ceramic matrix.

Preferably, the non-combustible porous ceramic matrix undergoes a volumetric change of less than or equal to about 5 percent as measured by dilatometry during combustion of the combustible fuel embedded within the non-combustible porous ceramic matrix. More preferably, the non-combustible porous ceramic matrix undergoes a volumetric change of less than or equal to about 1 percent as measured by non-contact dilatometry during combustion of the combustible fuel embedded within the non-combustible porous ceramic matrix.

Materials suitable for use in the non-combustible porous ceramic matrix of composite heat sources according to the present invention are known in the art and are commercially available from various suppliers.

Preferably, the non-combustible porous ceramic matrix comprises one or more oxides. Preferably, the non-combustible porous ceramic matrix comprises at least one transition metal oxide, more preferably at least one transition metal oxide with a high catalytic activity for the conversion of carbon monoxide to carbon dioxide. Suitable transition metal oxides are known in the art and include, but are not limited to, iron oxide, manganese oxide and mixtures thereof.

Alternatively or in addition, the non-combustible porous ceramic matrix may comprise one or more oxides of low thermal conductivity. Suitable oxides of low thermal conductivity include, but are not limited to, zirconia, quartz, amorphous silica and mixtures thereof. Non-combustible porous ceramic matrices having low thermal diffusivity for use in composite heat sources according to the invention may be formed from one or more particulate materials, such as, for example, zirconia ($ZrO_2$) and iron oxide ($Fe_2O_3$).

The strength of the non-combustible porous ceramic matrix may be provided by a binder, a consolidation treatment, or a combination thereof. Methods for consolidation treatment are known in the art. The consolidation treatment may involve a thermal process where contacts between particles of the non-combustible ceramic matrix are formed, for example by surface diffusion. Thermal treatment may involve gradual or stepwise heating to a desired maximum temperature, for example of up to about 750° C. and subsequent cooling. Heating, cooling or advantageously both heating and cooling are advantageously performed under an inert gas atmosphere, such as an argon or nitrogen atmosphere. Alternatively, the consolidation treatment may be a process like that described in DE-A-10 2004 055 900.

The consolidation treatment advantageously preserves sufficient pores within the non-combustible porous ceramic matrix for gas flow to and from the combustible fuel embedded within the non-combustible porous ceramic matrix.

The consolidation treatment should also preserve sufficient thermal resistance between adjacent particles of the non-combustible porous ceramic matrix to enable the combustible fuel embedded within the non-combustible porous ceramic matrix to be ignited using a match, lighter or other suitable ignition means within about 10 seconds.

Preferably, composite heat sources according to the present invention comprise at least one catalyst for the decomposition of a gas produced during combustion of the combustible fuel embedded within the non-combustible porous ceramic matrix.

The non-combustible porous ceramic matrix may comprise a catalyst for the decomposition of a gas produced by combustion of the combustible fuel. For example, as previously described above, the non-combustible porous ceramic matrix may comprise one or more transition metal oxides with a high catalytic activity for the conversion of carbon monoxide to carbon dioxide such as, for example, iron oxide or manganese oxide.

In such embodiments of the present invention, in use, as gas molecules produced during combustion of the combustible fuel flow out of the composite heat source through the pores in the non-combustible porous ceramic matrix, they have multiple contacts with the walls of the pore channels. The use in composite heat sources according to the present invention of a non-combustible porous ceramic matrix having catalytic activity can thereby advantageously help to ensure efficient removal of any potentially undesirable gases produced during combustion of the combustible fuel.

Alternatively or in addition, composite heat sources according to the present invention may comprise at least one catalyst embedded within the non-combustible porous ceramic matrix for the decomposition of a gas produced during combustion of the combustible fuel embedded within the non-combustible porous ceramic matrix.

Alternatively or in addition, at least a portion of the surface of the non-combustible porous ceramic matrix may be coated with a layer of a catalyst for the decomposition of a gas produced during combustion of the combustible fuel embedded within the non-combustible porous ceramic matrix.

The thermal conductivity, structure and dimensions of composite heat sources according to the present invention and the thermal contact between composite heat sources according to the present invention and any means or structure by which the composite heat sources are fixed, mounted or otherwise incorporated in a smoking article should be adjusted so that in use the surface temperature of the composite heat sources remain within the temperature range for optimum operation of any catalysts incorporated therein.

In use, composite heat sources according to the present invention preferably reach operational temperature within a period of about 30 seconds or less after ignition of the combustible fuel embedded in the non-combustible porous ceramic matrix.

To reduce the time taken to reach operational temperature, composite heat sources according to the present invention may further comprise one or more oxidants embedded within the non-combustible porous ceramic matrix that provide additional oxygen during ignition of the combustible fuel embedded within the non-combustible porous ceramic matrix. Suitable oxidants include, but are not limited to, nitrates, chlorates, perchlorates, permanganates and mixtures thereof.

The one or more oxidants may be distributed substantially evenly throughout the non-combustible porous ceramic matrix.

Alternatively, a mixture of the one or more oxidants and combustible fuel may be localised in a channel or other portion of the composite heat source that acts as a 'fuse' upon ignition of the composite heat source. For example, where the non-combustible porous ceramic matrix comprises at least one airflow passageway, a mixture of the one or more oxidants and combustible fuel may be localised in the at least one airflow passageway.

Composite heat sources according to the present invention for use in smoking articles are preferably capable of generating heat for about 10 minutes upon combustion of the combustible fuel embedded within the non-combustible porous ceramic matrix.

The non-combustible porous ceramic matrix may comprise one or more airflow passageways for one or both of gas exchange and heat exchange.

Preferably, composite heat sources according to the present invention have a maximum combustion temperature of between about 400° C. and about 800° C.

In use, the combustion kinetics of composite heat sources according to the present invention are controlled by the flow of oxygen to the combustible fuel embedded within the non-combustible porous ceramic matrix. In preferred embodiments of the present invention, the time controlling mechanism is the rate of diffusion of oxygen molecules through the pore channels in the non-combustible porous ceramic matrix.

The rate of diffusion of oxygen molecules through the pore channels in the non-combustible porous ceramic matrix increases slightly with increasing temperature. Therefore, to obtain a stable combustion temperature between about 400° C. and about 800° C., composite heat sources according to the present invention may include an additional mechanism to limit the rate of combustion of the combustible fuel embedded within the non-combustible porous ceramic matrix at high temperatures.

In certain embodiments of the present invention, the additional rate limiting mechanism may be a counter flow of gas molecules that is produced at high temperatures. For example, in embodiments of the present invention in which the combustible fuel embedded within the non-combustible porous ceramic matrix comprises carbon, the production of carbon monoxide due to combustion of the carbon increases at high temperature. Each molecule of oxygen flowing through the pore channels to the combustible fuel embedded within the non-combustible porous ceramic matrix results in the production of two molecules of carbon monoxide, which then have to flow out of the composite heat source through the pore channels. The diffusion of further oxygen molecules into the non-combustible porous ceramic matrix is retarded by the counter flow of carbon monoxide molecules out of the non-combustible porous ceramic matrix.

Alternatively or in addition, a counter flow of gas molecules may be produced at high temperatures by the release of gas from an additional component included in the non-combustible porous ceramic matrix. For example, a carbonate or a hydrate that thermally decomposes at an appropriately high temperature may be included in the non-combustible porous ceramic matrix.

In other embodiments of the present invention, the additional rate limiting mechanism may alternatively be a thermally activated change in porosity of the non-combustible porous ceramic matrix of the composite heat source. For example, sintering of a non-combustible porous amorphous ceramic matrix may reduce the size of the pores of the non-combustible porous amorphous ceramic matrix during combustion.

In yet further embodiments of the present invention, the redistribution of a melt formed during combustion of the combustible fuel embedded within the non-combustible porous ceramic matrix of the composite heat source may be used to control the combustion kinetics thereof. For example, the composite heat source may comprise a combustible fuel having a low melting point (such as, for example, aluminium or magnesium), which in use is soaked into the pore channels of the non-combustible porous ceramic matrix by capillary forces, thereby changing the reactivity of the non-combustible porous ceramic matrix and the cross section of the pore channels.

Preferably, the combustible fuel embedded within the porous ceramic matrix has an oxidation enthalpy of greater than or equal to $40 \times 10^9$ joules per cubic meter ($J/m^3$) as measured by dynamic scanning calorimetry (DSC).

Suitable combustible fuels for use in composite heat sources according to the present invention include, but are not limited to, carbon (such as, for example, charcoal (including hardwood charcoal powder) or carbon black), low atomic weight metals (such as, for example, aluminium or magnesium), carbides (such as, for example, aluminium carbide ($Al_4C_3$) and calcium carbide ($CaC_2$)), nitrides and mixtures thereof. Combustible fuels suitable for use in composite heat sources according to the present invention are commercially available.

Preferably, the volume fraction of the combustible fuel embedded in the non-combustible porous ceramic matrix is greater than or equal to about 20% of the composite heat source.

Preferably, the volume fraction of the combustible fuel embedded in the non-combustible porous ceramic matrix is less than or equal to about 50% of the composite heat source.

Preferred combustible fuels for use in composite heat sources according to the present invention essentially consist of one or more carbon compounds.

The ignitability of composite heat sources according to the present invention is controlled by the particle size and surface activity of the combustible fuel. Typically, particulate combustible fuels having small particle sizes are easier to ignite. However, it is more difficult to incorporate a high volume fraction of particulate combustible fuels having small particle sizes within the non-combustible porous ceramic matrix. To address this challenge, composite heat sources according to the present invention may comprise mixtures of particulate combustible fuels having particles of different size.

Where composite heat sources according to the present invention comprise two or more particulate combustible fuels having different median D53 particle sizes, the non-combustible porous ceramic matrix is formed from one or more particulate materials having a median D50 particle size at least five times less than the median D50 particle size of the particulate combustible fuel present in the greatest amount by weight.

Preferably, composite heat sources according to the present invention comprise one or more particulate combustible fuels having a particle size of between about 1 micron (μm) and about 200 microns (μm).

The combustible fuel may comprise one or more additives for reducing the ignition temperature of the combustible fuel.

Alternatively or in addition, the combustible fuel may comprise one or more additives for reducing the emission of potentially undesirable gases from the combustible fuel during combustion thereof.

In use, the combustible fuel embedded within the non-combustible porous ceramic matrix of composite heat sources according to the invention delivers the required heat of combustion.

In addition to the combustible fuel, part of the non-combustible porous ceramic matrix may also contribute to heat generation. For example, the non-combustible porous ceramic matrix of composite heat sources according to the present invention may comprise one or more oxides in a reduced state (such as, for example, $Fe_3O_4$), which support ignition of the composite heat sources through exothermic oxidation.

Composite heat sources according to the present invention may have any desired shape. Advantageously, the shape of composite heat sources according to the present invention is designed to provide a desired available surface area taking into account, for example, manufacturing considerations and performance requirements.

Preferably, composite heat sources according to the present invention are substantially cylindrical.

Preferably, composite heat sources according to the present invention are of substantially circular transverse cross section.

Composite heat sources according to the present invention may be produced using suitable known ceramic forming methods such as, for example, slip casting, extrusion, injection molding and die compaction. Co-extrusion and other suitable known techniques may also be employed where, for example, concentration gradients in the composite heat source are desired. Composite heat sources according to the present invention may be prepared from larger compacts by punching or cutting procedures.

The particulate combustible fuel may be embedded in the non-combustible porous ceramic matrix by mixing one or more particulate combustible fuels with a suitable amount of one or more particulate raw materials for forming the non-combustible porous ceramic matrix having a suitable relative particle size.

To avoid or reduce the formation of agglomerates, the particles of the one or more particulate combustible fuels are preferably not attracted to one another.

Alternatively or in addition, to avoid or reduce the formation of agglomerates, the particles of the one or more particulate raw materials for forming the non-combustible porous ceramic matrix are preferably not attracted to one another.

Preferably, the particles of the one or more particulate combustible fuels are attracted to the particles of the one or more particulate raw materials for forming the non-combustible porous ceramic matrix.

Organic binders may be used during the forming process. Other additives may also be included to, for example, facilitate processing (processing aids), such as, for example, lubricants, promote consolidation (sintering aids), combustion or removal of potentially undesirable combustion gases. Such additives and their utility are known in the art.

Where consolidation of composite heat sources according to the present invention is performed by a thermal treatment, the furnace atmosphere should be adapted to the requirements of the composite heat source. Typically, inert or reducing atmospheres should be used to prevent premature combustion of the combustible fuel embedded within the porous ceramic matrix.

During thermal treatment, phase changes may be used to enhance the activity of some of the components of composite heat sources according to the present invention or to improve other properties thereof.

For example, composite heat sources according to the invention may include $Fe_2O_3$, which is reduced to form $Fe_3O_4$, which has a very low combustion temperature, or FeO, which has a low thermal conductivity. Such phase changes may be controlled by controlling the furnace atmosphere (oxygen partial pressure) and the time temperature cycle in the furnace.

Additives that do not tolerate any of the previous process steps may be introduced into composite heat sources according to the invention by an additional infiltration step. For example, oxidants that would decompose during a thermal treatment may be added to composite heat sources according to the present invention by infiltration from salt solutions and subsequent drying of the composite heat sources.

Where composite heat sources according to the present invention comprise carbon as a combustible fuel, the carbon concentration near the surface of the composite heat sources may be advantageously reduced by a final treatment to reduce carbon monoxide emissions during combustion. For example, the outer surface of the composite heat sources may be quickly heated by a flame or other suitable method in order to burn the carbon locally without igniting the composite heat sources.

According to the present invention there is also provided a smoking article comprising: a composite heat source according to the invention; and an aerosol-generating substrate.

As used herein, the term 'aerosol-generating substrate' denotes a substrate capable of releasing volatile compounds upon heating to generate an aerosol.

The composite heat source and aerosol-generating substrate of smoking articles according to the present invention may abut one another. Alternatively, the composite heat source and the aerosol-generating substrate of smoking articles according to the present invention may be separated by suitable means (such as, for example thermal insulation or an air gap) to prevent ignition of the aerosol-generating substrate during combustion of the combustible fuel embedded within the non-combustible porous ceramic matrix of the composite heat source.

In certain embodiments of the present invention, the composite heat source is axially aligned with the aerosol-generating substrate, which is located downstream of the composite heat source. For example, composite heat sources according to the invention may be used in heated smoking articles of the type disclosed in WO-A-2009/022232, which comprise a combustible heat source, an aerosol-generating substrate downstream of the combustible heat source, and a heat-conducting element around and in contact with a rear portion of the combustible heat source and an adjacent front portion of the aerosol-generating substrate. However, it will be appreciated that composite heat sources according to the invention may also be used in smoking articles having other constructions.

As used herein, the terms 'upstream' and 'downstream' are used to describe the relative positions of components, or portions of components, of smoking articles according to the present invention in relation to the direction of air drawn through the smoking articles during use thereof.

In alternative embodiments of the present invention, the composite heat source is surrounded by the aerosol-generating substrate.

In alternative embodiments of the present invention, the aerosol-generating substrate is surrounded by the composite heat source. For example, smoking articles according to the present invention may comprise a hollow substantially cylindrical composite heat source that circumscribes the aerosol-generating substrate.

Smoking articles according to the present invention may further comprise an expansion chamber downstream of the composite heat source and aerosol generating substrate.

Smoking articles according to the invention may further comprise a mouthpiece downstream of the composite heat source, aerosol-generating substrate and, where present, expansion chamber.

The aerosol-generating substrate of smoking articles according to the present invention may include any material capable of releasing volatile compounds when contacted by hot gases flowing through the composite heat source. Preferably, the aerosol-generating substrate comprises tobacco.

Figure 2:
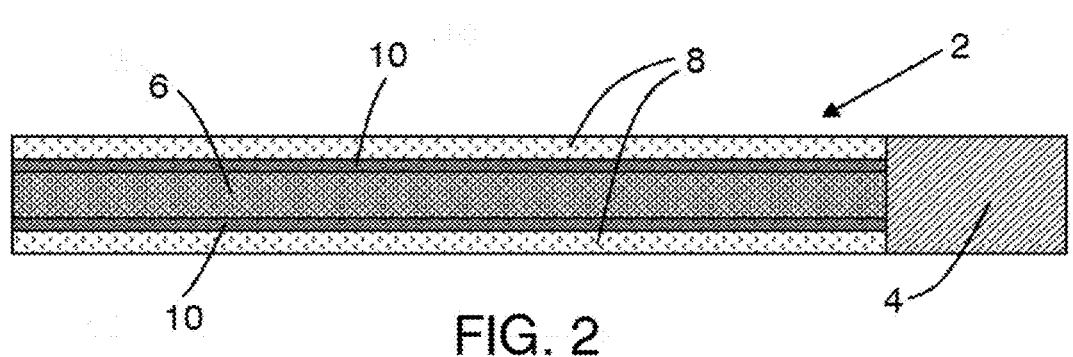
FIG. 2 shows a schematic longitudinal cross-sectional view of a smoking article according to a second embodiment of the present invention.

The smoking articles according to the first and second embodiments of the present invention shown in FIGS. 1 and 2, respectively, have several components in common; these components have been given the same reference numerals throughout.

Each smoking article generally comprises an elongate cylindrical rod 2, which is attached at one end to an axially aligned cylindrical filter 4. The elongate cylindrical rod 2 includes a cylindrical composite heat source 6 and an aerosol-generating substrate 8, which are overwrapped in an outer wrapper of cigarette paper (not shown). The composite heat source 6 is made as described in Composite Heat Sources: Example 1 or Composite Heat Sources: Example 2, below.

In the smoking article according to the first embodiment of the present invention shown in FIG. 1, the composite heat source 6 and the aerosol-generating substrate 8 are axially aligned. As shown in FIG. 1, the composite heat source 6 is located at the end of the rod 2 distant from the filter 4 and the aerosol-generating substrate 8 is located downstream of the composite heat source 6 at the end of the rod 2 adjacent the filter 4.

In the smoking article according to the second embodiment of the present invention shown in FIG. 2, the composite heat source 6 is located within and surrounded by the aerosol-generating substrate 8.

In a third embodiment of the present invention, which is not shown in the drawings, the composite heat source 6 is a hollow cylindrical tube and the aerosol-generating substrate 8 is located within and surrounded by the composite heat source 6.

In all three embodiments, thermal insulation or an air gap 10 is provided between the composite heat source 6 and the aerosol-generating substrate 8 in order to prevent ignition of the aerosol-generating substrate 8 during combustion of the combustible fuel embedded within the non-combustible porous ceramic matrix of the composite heat source 6.

In use, the consumer ignites the combustible fuel embedded within the non-combustible porous ceramic matrix of the composite heat source 6 and then draws air downstream through the rod 2 of the smoking article towards the filter 4 thereof. As it passes through the rod 2, the drawn air is heated by the composite heat source 6 and the heated air flows through the aerosol-generating substrate 8, releasing flavoured vapours from, for example, shredded tobacco cut filler in the aerosol-generating substrate 8. As the flavoured vapours released from the aerosol-generating substrate 8 pass downstream through the rod 2 they condense to form an aerosol that passes through the filter 4 into the mouth of the consumer.

Figure 3:
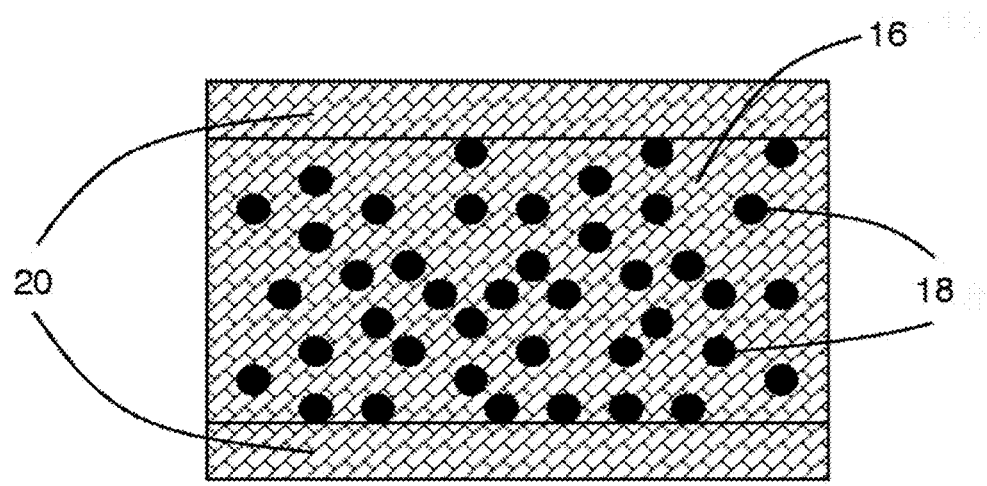
FIG. 3 shows a schematic longitudinal cross-sectional view of a composite heat source according to a first embodiment of the present invention.

Composite heat sources according to first and second embodiments of the present invention, for use in the smoking articles shown in FIGS. 1 and 2, are shown in FIGS. 3 and 4, respectively. The composite heat sources shown in FIGS. 3 and 4 have several components in common; these components have been given the same reference numerals throughout.

Each composite heat source is a cylinder of substantially circular transverse cross section and generally comprises a non-combustible porous ceramic matrix 16 and a plurality of particles of combustible fuel 18 embedded within the non-combustible porous ceramic matrix 16.

The composite heat source according to the first embodiment of the invention shown in FIG. 3 further comprises an outer insulating layer 20, which circumscribes the non-combustible porous ceramic matrix 16 and may be formed of the same or different material as the non-combustible porous ceramic matrix 16.

The composite heat source according to the second embodiment of the invention shown in FIG. 4 comprises a central cylindrical airflow passageway 22 that extends axially through the non-combustible porous ceramic matrix 16. As shown in FIG. 4, a layer of catalytic material 24 (such as, for example, iron oxide or manganese oxide) is disposed between the inner surface of the non-combustible porous ceramic matrix 16 and the airflow passageway 22.

It will be appreciated that in alternative embodiments of the present invention, not shown in the drawings, the outer insulating layer 20 and layer of catalytic material 24 shown in FIGS. 3 and 4, respectively, may be omitted.

It will also be appreciated that in further embodiments of the present invention, not shown in the drawings, composite heat sources according to the present invention may comprise both an outer insulating layer and a layer of catalytic material.

Composite Heat Sources

Example 1

Composite heat sources according to the present invention are prepared by mixing 236 g of iron oxide ($Fe_2O_3$) having a median D50 particle size of 0.140 μm commercially available from Alfa Aesar of Massachusetts, USA, 52 g of NORIT A Special E153 powdered activated carbon having a median D50 particle size of 4 μm commercially available from Norit Nederland BV of Amersfoort, The Netherlands, 104 g of hardwood charcoal powder having a median D50 particle size of 45 μm commercially available from Holzkohlewerk Lüneburg of Hamburg, Germany and 190 g of zirconia ($ZrO_2$) having a median D50 particle size of 0.6 μm commercially available from Wilhelm Priem GmbH & Co. KG of Bielefeld Germany in a planetary mixer. Mixing is carried out with the addition of 125 g of flour, 64 g of sugar, 14 g of corn oil and 24 g of potassium citrate. Water is slowly added to the mixture to obtain an extrudable paste.

The paste is then extruded through a die using a laboratory screw extruder to form cylindrical rods of circular cross-section having a length of about 30 cm and a diameter of about 7.8 mm. Three longitudinal airflow passageways having a diameter of about 1.66 mm are formed in the cylindrical rods by mandrels of circular cross-section mounted in the die orifice.

After extrusion, the cylindrical rods are dried on grooved plates. After drying, the cylindrical rods are cut into pieces having a length of about 10 cm. The pieces are heated in a furnace in an argon atmosphere from room temperature up to 100° C. over a period of 1.3 hours and then from 100° C. to 700° C. over a period of 2 hours. After a dwell period of 0.3 hours at 700° C., the furnace was cooled to room temperature.

The individual composite heat sources formed can be ignited using a yellow flame lighter and are found to combust for a period of 12 minutes with a maximum combustion temperature of 780° C.

After combustion, the composite heat sources are mechanically robust and, for example, cannot be fractured with fingers. Dusting is low. After combustion, the composite heat sources can be handled without major caution.

Composite Heat Sources

Example 2

Composite heat sources according the present invention are prepared by mixing 236 g of iron oxide ($Fe_2O_3$) having a median D50 particle size of 0.140 μm commercially available from Alfa Aesar of Massachusetts, USA, 52 g of NORIT A Special E153 powdered activated carbon having a median D50 particle size of 4 μm commercially available from Norit Nederland BV of Amersfoort, The Netherlands, 104 g of hardwood charcoal powder having a median D50 particle size of 45 μm commercially available from Holzkohlewerk Luneburg of Hamburg, Germany and 190 g of zirconia ($ZrO_2$) having a median D50 particle size of 0.6 μm commercially available from Wilhelm Priem GmbH & Co. KG of Bielefeld Germany in a planetary mixer. Mixing is carried out with the addition of 125 g of flour, 64 g of sugar, 14 g of corn oil and 24 g of potassium citrate. Water is slowly added to the mixture to obtain an extrudable paste.

The paste is then extruded through a die using a laboratory screw extruder to form cylindrical rods of circular cross-section having a length of about 30 cm and a diameter of about 7.8 mm. Three longitudinal airflow passageways having a diameter of about 1.66 mm are formed in the cylindrical rods by mandrels of circular cross-section mounted in the die orifice.

After extrusion, the cylindrical rods are dried on grooved plates. After drying, the cylindrical rods are cut into pieces having a length of about 10 cm. The pieces are heated in a furnace in a nitrogen atmosphere from room temperature up to 100° C. over a period of 1.3 hours and then from 100° C. to 680° C. over a period of 1.9 hours. After a dwell period of 0.2 hours at 680° C., the furnace is cooled to room temperature.

The individual composite heat sources formed can be ignited using a blue flame lighter and are found to combust for a period of 12 minutes with a maximum combustion temperature of 800° C.

The composite heat sources are mechanically robust before and after combustion and, for example, cannot be fractured with fingers. Dusting is minimal.

The invention claimed is:

1. A composite heat source for a smoking article, comprising:
a non-combustible porous ceramic matrix; and
a particulate combustible fuel embedded within the non-combustible porous ceramic matrix,
wherein the non-combustible porous ceramic matrix is formed from one or more particulate materials having a median D50 particle size that is at least five times less than a median D50 particle size of the particulate combustible fuel, and
wherein a volume fraction of the particulate combustible fuel embedded within the non-combustible porous ceramic matrix is less than or equal to about 50% of a bulk volume of the composite heat source.

2. The composite heat source according to claim 1, wherein the non-combustible porous ceramic matrix comprises one or more oxides.

3. The composite heat source according to claim 2, wherein the non-combustible porous ceramic matrix comprises one or more transition metal oxides.

4. The composite heat source according to claim 2, wherein the non-combustible porous ceramic matrix comprises one or more oxides selected from the group consisting of: iron oxide; manganese oxide; zirconia; quartz; and amorphous silica.

5. The composite heat source according to claim 1, wherein the non-combustible porous ceramic matrix has pores with diameters of between about 0.01 μm and about 10 μm.

6. The composite heat source according to claim 1, wherein the non-combustible porous ceramic matrix has a thermal diffusivity of less than or equal to about $1 \times 10^{-6}$ m$^2$/s.

7. The composite heat source according to claim 1, wherein the combustible fuel has an oxidation enthalpy of greater than or equal to about $40 \times 10^9$ J/m$^3$.

8. The composite heat source according to claim 1, wherein the combustible fuel comprises carbon, aluminium, magnesium, one or more metal carbides, one or more metal nitrides, or a combination thereof.

9. The composite heat source according to claim 1, further comprising at least one catalyst for the decomposition of a gas produced by combustion of the fuel.

10. The composite heat source according to claim 9, wherein the at least one catalyst is embedded within the non-combustible porous ceramic matrix.

11. The composite heat source according to claim 1, further comprising one or more oxidants.

12. The composite heat source according to claim 11, wherein the one or more oxidants are selected from the group consisting of: nitrates; chlorates; perchlorates; and permanganates.

13. The composite heat source according to claim 1, further comprising at least one airflow passageway.

14. A smoking article, comprising:
a composite heat source comprising:
a non-combustible porous ceramic matrix; and
particulate combustible fuel embedded within the non-combustible porous ceramic matrix,
wherein the non-combustible porous ceramic matrix is formed from one or more particulate materials having a median D50 particle size that is at least five times less than a median D50 particle size of the particulate combustible fuel, and
wherein a volume fraction of the particulate combustible fuel embedded within the non-combustible porous ceramic matrix is less than or equal to about 50% of a bulk volume of the composite heat source; and
an aerosol-generating substrate.

* * * * *